Feb. 3, 1959 E. BELEK ET AL 2,872,624

MOUNTING AND CONNECTING APPARATUS

Filed May 15, 1957 4 Sheets-Sheet 1

INVENTORS E. BELEK
H. A. MILOCHE
H. G. REIMELS

BY John C. Morris
ATTORNEY

MOUNTING AND CONNECTING APPARATUS

Filed May 15, 1957

4 Sheets-Sheet 2

INVENTORS E. BELEK
H. A. MILOCHE
H. G. REIMELS
BY John C. Morris
ATTORNEY

Feb. 3, 1959 E. BELEK ET AL 2,872,624

MOUNTING AND CONNECTING APPARATUS

Filed May 15, 1957 4 Sheets-Sheet 3

INVENTORS E. BELEK
H. A. MILOCHE
H. G. REIMELS

BY John C. Morris

ATTORNEY

INVENTORS E. BELEK
H. A. MILOCHE
H. G. REIMELS

BY John C. Morris
ATTORNEY

United States Patent Office 2,872,624

Patented Feb. 3, 1959

2,872,624

MOUNTING AND CONNECTING APPARATUS

Emil Belek, New Hyde Park, N. Y., Herman A. Miloche, Teaneck, N. J., and Harry G. Reimels, Bethpage, N. Y., assignors to Bell Telephone Laboratories, Incorporated, New York, N. Y., a corporation of New York Application May 15, 1957, Serial No. 659,273

1 Claim. (Cl. 317—99)

This invention relates to a panel assembly, and more particularly to a panel assembly for supporting and interconnecting a plurality of electrical components.

A number of telephone systems for the automatic identification of calling subscriber numbers have been studied. One system selected for development employs for each subscriber number a network comprising four electrical components. As 10,000 of these networks are required per 10,000-line telephone office, it is clear that a compact, low-cost, easily accessible and reliable network mounting and interconnecting structure is an economic necessity.

The present invention is a modification of the panel assembly fully described in R. F. Ewald's patent application, Serial No. 659,301, filed May 15, 1957.

An object of this invention is to facilitate the supporting and interconnecting of a large number of electrical components.

Another object of the present invention is a compact, economically manufactured, and easily maintained panel assembly.

These and other objects of this invention are realized in an illustrative embodiment thereof wherein two apertured insulating sheets, each having a plurality of horizontal bus bars securely staked thereto, are attached to a rigid frame member.

The staked horizontal bus bars include integrally formed portions which extend through openings in the sheets and project beyond the outer surfaces of what will hereinafter be referred to as the "front faces" thereof to provide convenient terminal portions.

The frame member to which the panels are attached has secured thereon several grounding strips, and the ends of these grounding strips are formed as terminal or wire-receiving portions.

The electrical components intended to be combined with the panels are mounted on network assembly cards. Each card includes projecting portions (network terminals and extensions of bus bar members carried on the card) which are designed to extend through openings in a panel sheet to provide wire-receiving members beyond the front face thereof.

A ground strap member on each card includes ear portions which are designed to be secured to the aforementioned frame grounding strips. The ear portions serve to connect points of each card network to the ground system of the composite panel-card structure, and also serve to connect the cards to the frame member in a mechanically secure manner.

When fastened in their mounting positions, by means of fasteners and the ground member ears, the cards straddle the horizontally extending panel bus bars, and the projecting terminal members of the card assemblies extend through preassigned openings in the panels.

Accordingly, a feature of this invention is a panel assembly comprising interfitting panel and component-carrying card structures, each of a plurality of zones of the front surfaces of the panels including panel bus bar appearances and card extensions, whereby a large number of components can be mechanically mounted and electrically interconnected in a low-cost, compact assembly.

Another feature of the present invention is a component-carrying card structure for mounting a plurality of components, the card structure including a ground strap member and conductive extension members, whereby the card can be mounted as a part of a panel assembly and the components thereby placed in position for connection into an electrical system.

Another feature of this invention is a single layer panel assembly wherein, for ease of wiring and maintenance, all bus bar appearances are located on the front side of the assembly.

And still another feature of the present invention is a rugged panel assembly wherein, for ease in trouble-checking and more particularly to obviate hidden troubles, all the bus bars are exposed on the backside of the assembly.

Thus, in accordance with the principles of this invention, a compact and easily interfitted panel-component card structure is provided, by means of which a multiplicity of components can be securely mounted in an arrangement that allows them to be interconnected into an electrical system in an expeditious and reliable manner.

A complete understanding of the invention and of these and other features and advantages thereof may be gained from a consideration of the following detailed description in conjunction with the accompanying drawing, in which.

Figure 1:
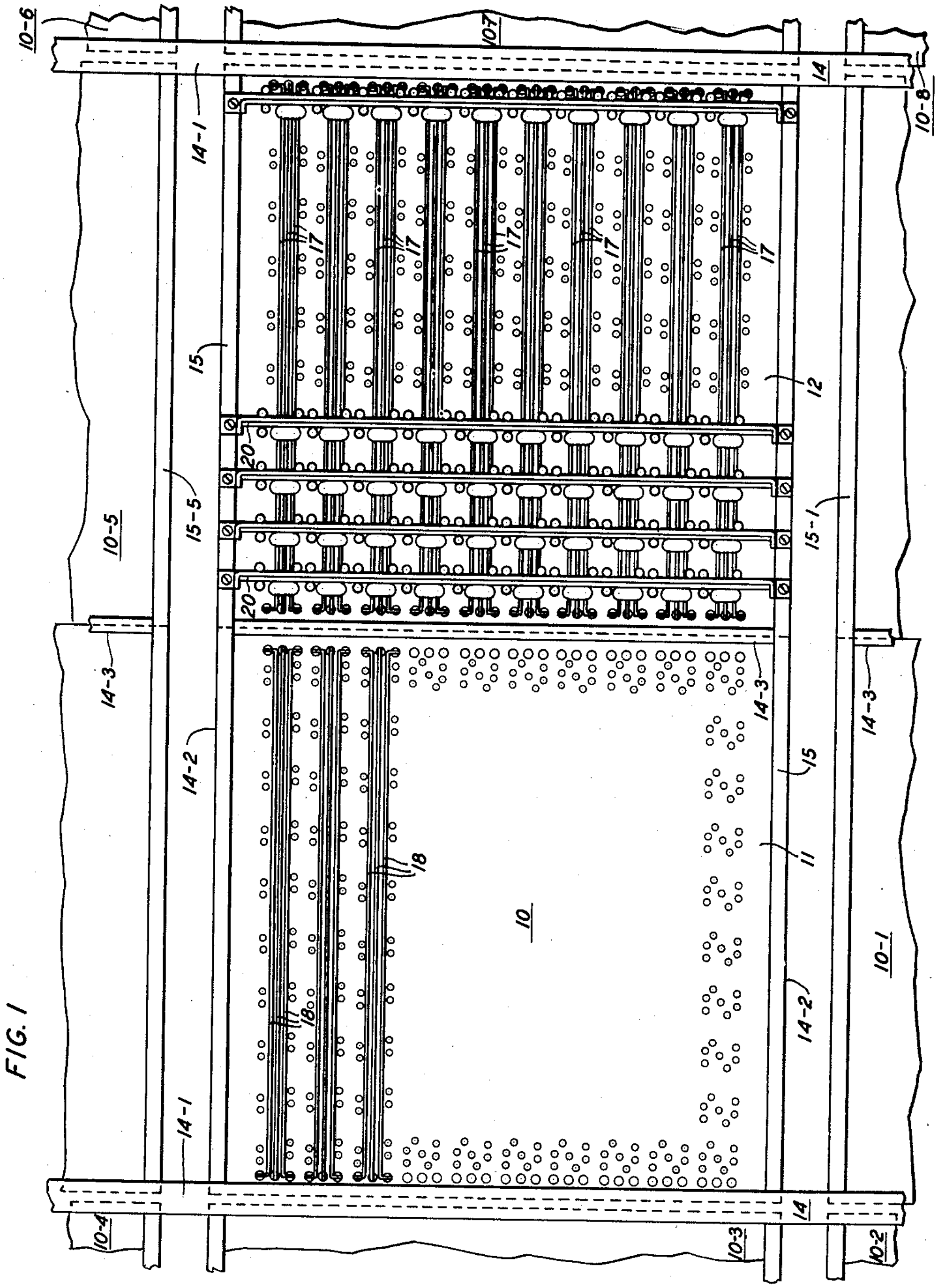
Fig. 1 is an elevation view of the backside of a panel assembly made in accordance with the principles of the present invention, portions of other such assemblies being shown in typical mounted relation thereto.

Referring now to Fig. 1, there is shown a panel assembly 10 comprising two apertured insulating sheets 11 and 12 which are secured to a rigid frame assembly 14. The frame assembly 14, which advantageously may be made of welded-together elements of steel, includes spaced upright members 14–1, horizontal crosspieces 14–2, and a vertical center support 14–3.

Figure 4:
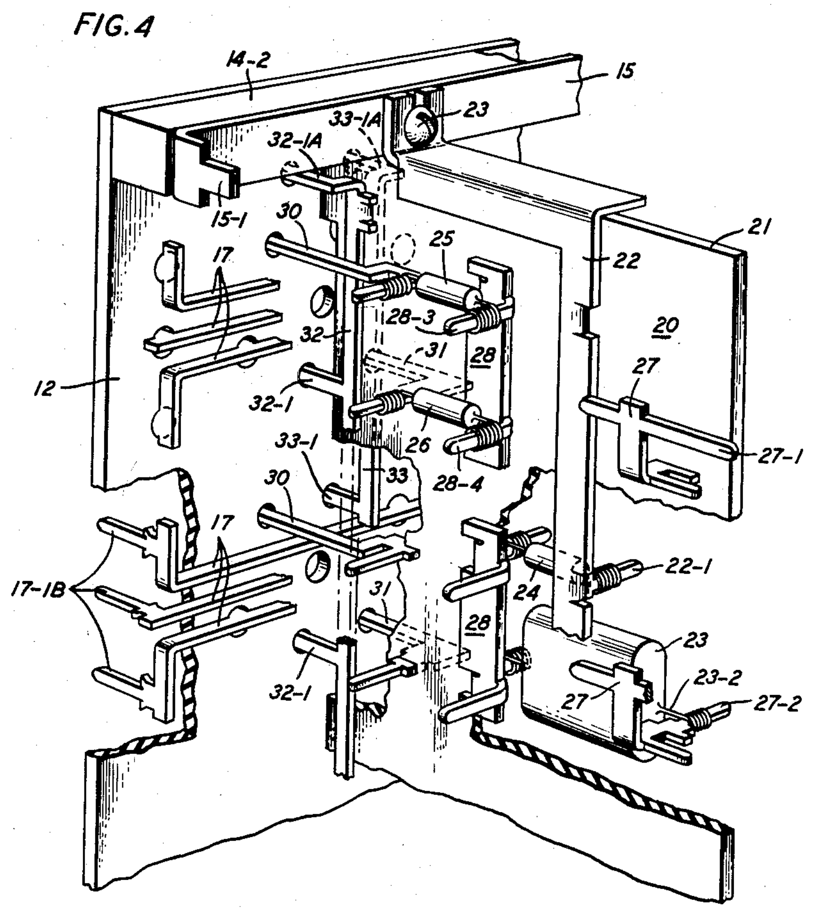
Fig. 4 is an enlarged perspective view of the upper left-hand corner of the center assembly of Fig. 1.

Attached to the horizontal crosspieces 14–2 of the frame assembly 14 are grounding strips 15, one of which is seen clearly in Fig. 4.

It is to be noted that, in the interest of clarity of presentation, the center panel assembly of Fig. 1 is shown as including only five component card structures 20, rather than the twenty which the specific illustrative embodiment there illustrated is designed to include.

Mounted in adjacent relation to the center panel assembly 10 are panel assemblies 10–1, 10–2, 10–3, 10–4, 10–5, 10–6, 10–7 and 10–8, each of which is identical to the assembly 10. The manner in which the adjacent panel assemblies may be connected to the center assembly 10 is described in detail herein-below.

The right-hand insulating sheet 12, of the center assembly 10 of Fig. 1, has securely staked thereto thirty horizontal bus bar members 17. Similarly, the left-hand insulating sheet 11 also is designed to have thirty horizontal bus bars 18 staked thereto. In the interest of not unduly complicating Fig. 1, however, sheet 11 is shown as having only nine horizontal bus bars 18 associated therewith.

Figure 2:
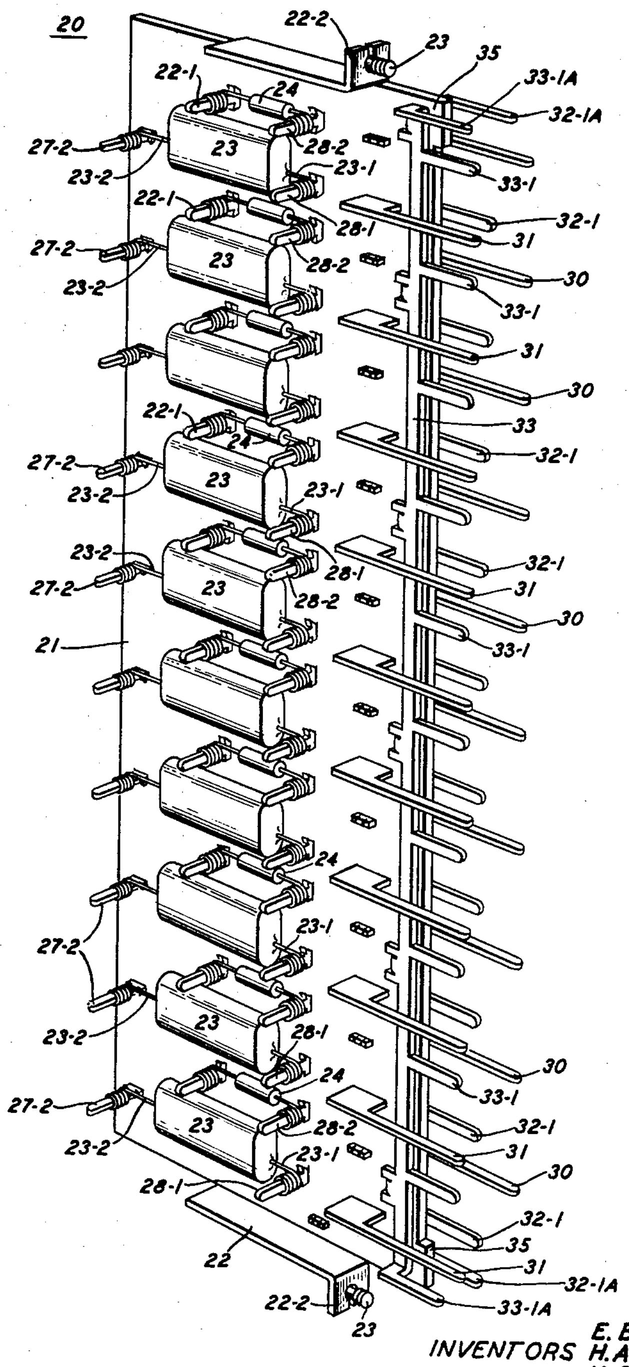
Figs. 2 and 3 are enlarged perspective views of a component-carrying card structure of the type shown in Fig. 1.
Figure 3:
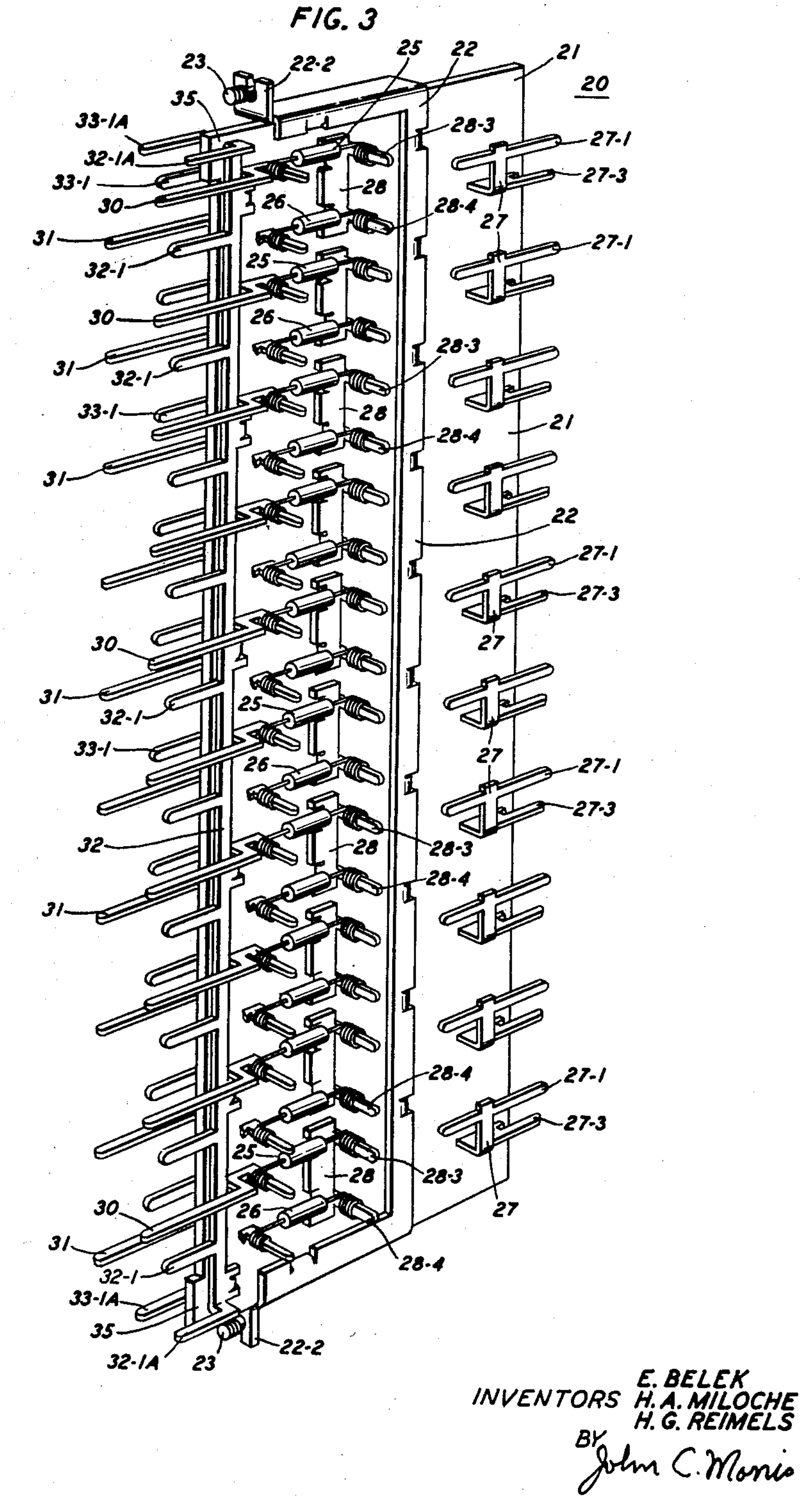

Turning now to Figs. 2 and 3, there is shown a component card assembly of a type intended to be combined with the insulating sheets 11 and 12, to form a panel assembly illustratively embodying aspects of this invention.

The specific component card assembly shown in Figs. 2 and 3 is a ten-circuit package, each circuit comprising four electrical components, e. g., a capacitor 23 and three resistors 24, 25 and 26. Twenty of these component cards can be incorporated in the panel assembly 10, thus forming a supporting and interconnecting structure for 800 electrical components in a space of about ten inches by twenty inches.

Each component-carrying structure 20 comprises an insulating sheet or card 21 having securely staked thereto a ground strap member 22 (Fig. 3), which includes a plurality, e. g., ten, of terminal portions 22–1 (Fig. 2). The member 22 also includes end flange portions 22–2 which are apertured to receive fastening means 23. The fasteners 23 are designed to engage mating holes in the above-mentioned frame-held grounding strips 15, thereby electrically connecting the strap 22 to the strip 15, and, in so doing, also mechanically mounting the card structures 20 in a secure fashion to the frame crosspieces 14–2.

Each card carries a plurality of staked conductive elements 27 (Fig. 3). The elements 27 include input terminal portions 27–1, projections 27–3 to which jacks (not shown) may be conveniently connected for test purposes, and terminal portions 27–2 (Fig. 2), each of which has a capacitor lead 23–2 connected thereto.

The other capacitor leads 23–1 are connected respectively to terminal projections 28–1 of conductive elements 28 (Fig. 3). Each element 28 also comprises three other terminal portions, namely, 28–2, 28–3 and 28–4. Each portion 28–2 has a lead of one of the components 24 secured thereto. The other leads of the components 24 are connected respectively to the projections 22–1 of the ground strap 22.

The terminal portions 28–3 and 28–4 have the components 25 and 26, respectively, connected thereto. The other leads of the components 25 are connected respectively to stake members 30, and each other lead of the components 26 is connected to a stake member 31.

Thus, the electrical path from each input terminal 27–1 extends through one of the capacitors 23 to the conductive element 28, to which element one each of the resistors 24, 25 and 26 is connected. The resistor 24 electrically extends to the ground strap 22, while the resistors 25 and 26 are connected respectively to the terminal stakes or legs 30 and 31.

Also secured to the insulating card 21 are bus bars 32 (Fig. 3) and 33 (Fig. 2). The bars 32 and 33 include integrally formed portions 32–1 and 33–1, respectively, which project beyond one edge of the card 21 and extend in parallel relation to the terminal legs 30 and 31.

Two portions of each card 21 are formed as spacer legs 35. These spacer legs 35, which are sandwiched between the card bus bars 32 and 33, are designed so that the mounted card assemblies 20 straddle the horizontal panel bus bars 17 and 18 in non-contacting relation thereto.

Now turning to Fig. 4, there is clearly shown the manner in which one of the network assemblies 20 may be combined with the panel sheets to form an illustrative embodiment of this invention.

The card assembly 20 is secured to the grounding strip 15 and the frame crosspiece 14–2 by the fastener 23. In so mounting the card assembly, the stake members 30 and 31, to which the components 25 and 26 are respectively secured, and the card bus bar projections 32–1 and 33–1 extend through openings in the panel 11 and project beyond the front surface thereof to provide terminal members to which electrical connections may be made.

Further, the horizontal bus bars 18 secured to the panel 11 include integrally formed terminal portions which extend through openings in the panel 11 and also project beyond the front surface thereof.

Figure 5:
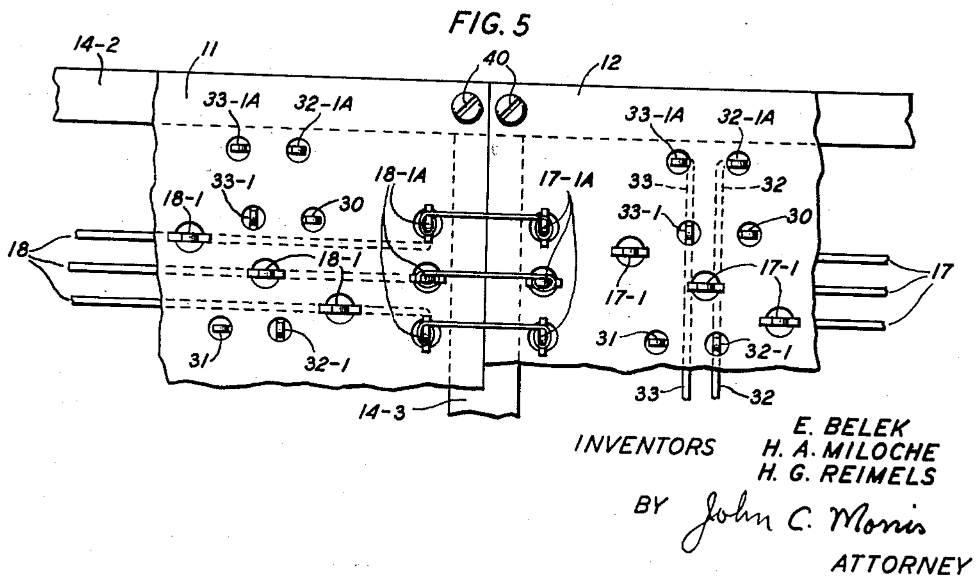
Fig. 5 is an elevation view of a portion of the front side of the center assembly of Fig. 1.

The projecting extensions 17–1 and 18–1 of the horizontal bus bars are shown in Fig. 5. Also there shown are the fasteners 40 by means of which the insulating panels 11 and 12 are secured to the frame crosspieces 14–2. It is noted that the elements 40 may advantageously be shoulder-type fasteners. Such fasteners allow the panels 11 and 12 to expand and contract relatively freely in response to changing atmospheric conditions, and so minimize the strains imparted to the panels by such changing conditions.

Closely grouped about the bus bar extensions 17–1 and 18–1 (Fig. 5) are the card assembly terminal or stake legs 30 and 31, and the projecting portions 32–1 and 33–1 of the card assembly bus bars 32 and 33. Each group of seven openings, and the projections extending therethrough, is associated with one of the component networks of the card assemblies 20.

Adjacent to the vertical frame member 14–3, and at the ends of the horizontal bus bars 17 and 18, there are formed projecting portions 17–1A and 18–1A, respectively. As shown in Fig. 5, the end portions 18–1A may be respectively connected to the end portions 17–1A so as to form in effect longitudinally extending members which electrically span both of the panels 11 and 12 of the center assembly of Fig. 1.

The card assembly bus bars include extentions 32–1A and 33–1A (Fig. 5) which may, in an illustrative panel assembly, be connected to corresponding extensions on an adjacent panel assembly. Thus, for example, vertically extending jumper leads may be employed to connect the 32–1A and 33–1A terminals of the panel assembly 10 to the in-line bus terminals or appearances on the adjacent panel assemblies 10–1 and 10–5 (Fig. 1).

Also, appearances 17–1B and 18–1B of the horizontal bus bars, which appearances are located toward the outer edges of the panels 12 and 11, respectively, of the center assembly of Fig. 1 (see Fig. 4 for a showing of the outer edge appearances of the bus bars 18), may be connected by horizontally extending jumper connections to the corresponding in-line horizontal bus projections on the adjacent panel assemblies 10–7 and 10–3 (Fig. 1).

The grounding strips 15 include terminal portions 15–1 (Fig. 4) by means of which the strips of a number of panel assemblies can be interconnected.

The grounding strip terminal portions 15–1, and the other terminal or projecting members described herein, may advantageously be square or rectangular in cross section so that wire-wrapped connections, of the type described in Patent 2,759,166, R. F. Mallina, August 14, 1956, may be made thereto.

The stakes 30 and 31, which are electrically connected to the components 25 and 26, respectively, in each card assembly network, may be connected in any desired fashion to the bus bar appearances grouped therewith, namely, 18–1, 32–1 and 33–1 (Fig 5), and these bus bars may, as described above, be connected to the bus bars of adjacent panel assemblies. Finally, when an end panel assembly is reached, the projecting portions of the bus bars thereon may then be connected to an external electrical system in any preassigned manner.

Thus, it is seen that illustrative embodiments of the present invention enable a multiplicity of electrical components to be mechanically mounted and electrically interconnected to a plurality of input terminals and to a bus bar distribution system, which distribution system may, in turn, be connected to associated external circuitry.

Fanning strips, apertured frame members and other accessory apparatus may be easily combined with illustrative embodiments of this invention by those skilled in the art of wire-installing to facilitate the running of leads to the tie points of the panel assemblies.

These additional features have not been shown as they are considered to be within the skill of the art. To have included them might have unnecessarily obscured the presentation of the invention.

It is, of course, to be understood that the above-described structural arrangements are illustrative only and not restrictive of the principles of this invention. Thus, for example, in other illustrative embodiments, a single panel and continuous horizontal bus bars secured thereto and extending thereacross, rather than two panel sheets and interconnected horizontal bus bars, might be employed. Other arrangements may be devised by those skilled in the art without departing from the spirit and scope of the invention.

What is claimed is:

A panel assembly for mounting and interconnecting a multiplicity of electrical components comprising a frame, a panel, and a plurality of card assemblies, each of said card assemblies comprising an insulating sheet having mounted thereon a ground strap element and a plurality of first terminal members, said ground strap element including a plurality of second terminal members and end flange portions, which end portions respectively include fasteners, each of said card assemblies also including a plurality of electrical components connected to said first and second terminal members, said frame having said panel secured to one side thereof and an apertured ground strap member secured to the other side thereof, said panel comprising apertures and terminal elements, selected ones of said first terminal members of said card assemblies projecting beyond one edge of each card assembly in registry with the apertures in said panel, whereby when said selected first terminal members are extended through said panel apertures to extend beyond a surface of said panel, said ground strap fasteners extend into the apertures in said ground strap members, thereby both to mount the card assemblies in a mechanically secure fashion to said frame and to electrically connect said second terminal members to said ground strap member, whereby said selected terminal members are in position to be interconencted to said panel terminal elements.

References Cited in the file of this patent

UNITED STATES PATENTS

| | | |
|---|---|---|
| 132,216 | Siemens | Sept. 11, 1919 |
| 1,629,645 | Starrett | May 24, 1927 |
| 1,929,925 | Kuhn | Oct. 10, 1933 |
| 2,226,745 | Schrack | Dec. 31, 1940 |
| 2,474,988 | Sargrove | July 5, 1949 |